United States Patent
Paulse et al.

[11] Patent Number: 5,820,085
[45] Date of Patent: Oct. 13, 1998

[54] HAND SUPPORT WITH POSITIONER FOR USE WITH COMPUTER INPUT DEVICES

[75] Inventors: Michael Herbert Paulse; Randy Wayne Hoffman, both of Vancouver, Canada

[73] Assignee: OR Computer Keyboards Ltd., North Vancouver, Canada

[21] Appl. No.: 717,053

[22] Filed: Sep. 20, 1996

[51] Int. Cl.⁶ .................................................. A47B 91/00
[52] U.S. Cl. ................................... 248/118.5; 248/118.1; 248/918
[58] Field of Search ............................. 248/118.5, 118.1, 248/118, 918; 400/715

[56] References Cited

U.S. PATENT DOCUMENTS

| | | |
|---|---|---|
| 176,010 | 4/1876 | Knapp . |
| 1,025,746 | 5/1912 | Mellen . |
| 1,277,169 | 8/1918 | Anderson . |
| 4,332,263 | 6/1982 | Kitrell . |
| 4,482,064 | 11/1984 | Berke et al. . |
| 4,545,554 | 10/1985 | Latino et al. . |
| 4,561,183 | 12/1985 | Shores . |
| 4,621,781 | 11/1986 | Springer . |
| 4,709,972 | 12/1987 | LaBudde et al. . |
| 4,862,165 | 8/1989 | Gart . |
| 4,913,390 | 4/1990 | Berke . |
| 4,973,176 | 11/1990 | Dietrich . |
| 4,976,407 | 12/1990 | Schwartz et al. . |
| 5,004,196 | 4/1991 | Gross . |
| 5,029,260 | 7/1991 | Rollason . |
| 5,058,840 | 10/1991 | Moss et al. . |
| 5,074,511 | 12/1991 | Wilson . |
| 5,088,668 | 2/1992 | Grimm . |
| 5,125,606 | 6/1992 | Cassano et al. . |
| 5,131,614 | 7/1992 | Garcia et al. . |
| 5,135,190 | 8/1992 | Wilson . |
| 5,137,384 | 8/1992 | Spencer et al. . |
| 5,145,270 | 9/1992 | Darden . |
| 5,158,256 | 10/1992 | Gross . |
| 5,161,760 | 11/1992 | Terbrack . |
| 5,165,630 | 11/1992 | Connor . |
| 5,193,771 | 3/1993 | Hassel et al. . |
| 5,197,699 | 3/1993 | Smith et al. . |
| 5,201,485 | 4/1993 | Moss et al. . |

(List continued on next page.)

FOREIGN PATENT DOCUMENTS

| | | |
|---|---|---|
| 3306056 | 9/1984 | Germany . |
| 9209935 | 10/1992 | Germany . |
| 2288454 | 10/1995 | United Kingdom . |

OTHER PUBLICATIONS

Patent Cooperation Treaty Publication No. WO 94/06331; Publication Date Mar. 31, 1994; International Application Serial No. PCT/US93/08369; International Filing Date Sep. 7, 1993; Title—Computer Mouse Tower.

Patent Cooperation Treaty Publication No. WO 93/13515; Publication Date Jul. 8, 1993; International Application Serial No. PCT/FR92/01236; International Filing Date Dec. 23, 1992; Title—Support for the Arms and Hands of a User of a Keyboard, Drawing, Knitting Instrument or Apparatus.

IBM Technical Disclosure Bulletin; vol. 34 No. 8; pp. 451–453; Economic Pad for Workstation Graphic Tablet "Puck" (4–Button Cursor); New York, United States; Jan. 1992.

Mouse Arena Assembly Instructions; Forminco; copyright 1990; U.S. and Foreign patents and design patents pending.

*Primary Examiner*—Peter M. Cuomo
*Assistant Examiner*—Hanh V. Tran
*Attorney, Agent, or Firm*—Fulbright & Jaworski L.L.P.

[57] ABSTRACT

A hand support apparatus has a mechanism for positioning it adjacent a computer input device on a work surface. The apparatus includes a first connector connectable to the computer input device, the hand support itself and a coupler connected between the first connector and the hand support. The coupler couples the first connector to the hand support while permitting extension and retraction of the first connector relative to the hand support, in an operating space adjacent to the hand support.

26 Claims, 4 Drawing Sheets

U.S. PATENT DOCUMENTS

| | | |
|---|---|---|
| 5,203,527 | 4/1993 | Rubey . |
| 5,203,845 | 4/1993 | Moore . |
| 5,211,367 | 5/1993 | Musculus . |
| 5,219,136 | 6/1993 | Hassel et al. . |
| 5,228,655 | 7/1993 | Garcia et al. . |
| 5,234,186 | 8/1993 | Powell . |
| 5,246,191 | 9/1993 | Moss . |
| 5,265,835 | 11/1993 | Nash . |
| 5,281,001 | 1/1994 | Bergsten et al. . |
| 5,340,067 | 8/1994 | Martin et al. . |
| 5,340,075 | 8/1994 | Schriner . |
| 5,342,006 | 8/1994 | Tice . |
| 5,351,897 | 10/1994 | Martin . |
| 5,369,805 | 12/1994 | Bergsten et al. . |
| 5,386,956 | 2/1995 | Hatcher . |
| 5,398,896 | 3/1995 | Terbrack . |
| 5,407,249 | 4/1995 | Bonutti . |
| 5,465,931 | 11/1995 | MacDonald . |
| 5,470,036 | 11/1995 | Vu et al. . |
| 5,472,161 | 12/1995 | Krukovsky . |
| 5,483,898 | 1/1996 | Seidl . |
| 5,487,525 | 1/1996 | Drabezyk et al. . |
| 5,490,647 | 2/1996 | Rice . |

HAND SUPPORT WITH POSITIONER FOR USE WITH COMPUTER INPUT DEVICES

BACKGROUND OF THE INVENTION

This invention relates to a hand support with a positioner for positioning the hand support in proximity to a computer input device such as a mouse.

The use of computer input devices such as computer mice is becoming increasingly prevalent in modern computing. However, use of a computer mouse can be hazardous to the user. Basic use of a computer mouse on a work surface provided by a table, for example, requires positioning the user's hand in a generally horizontal position which can cause the tendons in the hand to lie in a strained position, often resulting in discomfort. In addition, use of the mouse involves moving it around on the work surface both by finger movements and by hand movements. Finger movements, of course, are for fine movement of the mouse and hand movements provide coarse movement of the mouse. Such movements, however, can cause abrasion of the underside of the user's wrist, thumb and fingers and can cause fatigue of finger and hand muscles.

Some relief is provided by hand supports such as disclosed in U.S. Pat. No. 5,490,647 to Rice and in U.S. Pat. No. 5,340,067 to Martin et al. But care must be taken when the hand is removed from the hand support to space and orient the hand support relative to the mouse so that the hand support is positioned to receive the hand when it is returned to the mouse.

Positioning the hand support each time the hand uses the mouse can be distracting and can cause fatigue.

The present invention attempts to reduce such fatigue.

SUMMARY OF INVENTION

According to one aspect of the invention, there is provided an apparatus for positioning a hand support adjacent a computer input device on a work surface. The apparatus includes a first connector connectable to the computer input device, a hand support operable to slide on the work surface and a coupler connected between the first connector and the hand support. The coupler couples the first connector to the hand support while permitting extension and retraction of the first connector relative to the hand support, in an operating space adjacent to the hand support.

Preferably, the coupler includes a flexible tension link extending between the first connector and the hand support and includes an urger for urging together the first connector and the hand support.

Preferably, the urger is operable to provide a force between the first connector and the hand support over the entire range of extension of the first connector relative to the hand support.

In one embodiment, the urger includes a flexible tension link and a spring connected between the flexible tension link and at least one of the first connector and the hand support. Preferably, the spring includes an extension spring having first and second end portions and a longitudinal axis, the first end portion being connected to the hand support and the second end portion being connected to the flexible tension link such that the spring is bent off the longitudinal axis when the flexible tension link is withdrawn from the hand support.

Preferably, the hand support includes a housing having an opening positioned adjacent the operating space with the flexible tension link extending through the opening.

Preferably, the hand support has a palm support for supporting the palm of a user's hand, the palm support being positioned adjacent the opening and adjacent the operating space.

Preferably, the apparatus includes a spacer positioned on the hand support for spacing the computer input device from the hand support such that the computer input device lies in a rest position in the operating space. In one embodiment, the spacer includes a bumper positioned to lie between the hand support and the connector and at least one compression spring for connecting the bumper to the hand support and for positioning the bumper at a distance from the hand support, in the operating space. Preferably, the bumper extends on opposite sides of the opening.

It is desirable that the housing have a low friction slidable portion operable to slide on the work surface. The low friction slidable portion may include a TEFLON surface.

Preferably, the housing also has a heel support for supporting the heel of a user's hand.

It is desirable that the first connector includes first and second complementary portions, at least one of the complementary portions being on the computer input device. In one embodiment the first and second complementary portions include hook and loop fasteners respectively.

The urger may include a flexible tension link and a lever, the flexible tension link being connected to the lever and the first connector and the lever being biased to pull the flexible tension link toward the hand support. The urger may also include an elastic band connected to the lever and the hand support to bias the lever into a position in which the flexible tension link is pulled toward the hand support.

The spacer may include a bumper positioned to lie between the hand support and the connector, a lever connected to the bumper, and an elastic band connected between the lever and the hand support such that the lever is biased into a rest position to position the bumper at a distance from the hand support and such that the lever rotates to extend the elastic band when the bumper is moved toward the hand support, thereby providing a force on the lever, tending to rotate the lever to move the bumper back into the rest position.

Preferably, the bumper is operable to contact the hand support.

The present invention reduces fatigue by coupling the mouse to the hand support in such a manner that the mouse is kept within an operating area adjacent the hand support.

BRIEF DESCRIPTION OF THE DRAWINGS

In drawings which illustrate embodiments of the invention.

DETAILED DESCRIPTION

Figure 1:
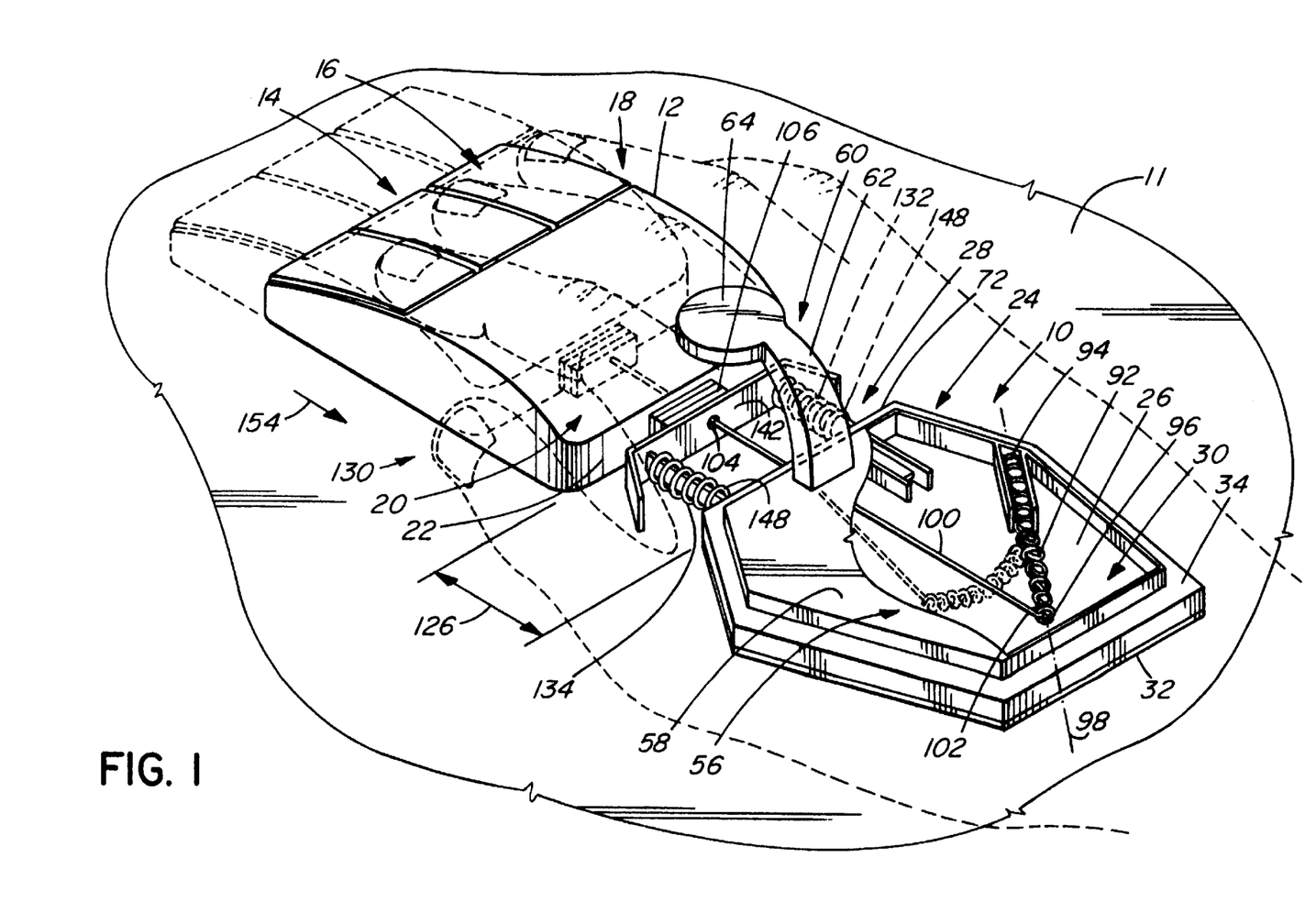
FIG. 1 is a partially fragmented oblique view of an apparatus according to a first embodiment of the invention from above.

Referring to FIG. 1, an apparatus according to a first embodiment of the invention is shown generally at 10 on a work surface 11. The apparatus is shown adjacent a computer input device which in this embodiment is a computer mouse 12. As is conventional, the computer mouse has a forward portion 14 having a plurality of actuators 16 for actuation by a user's fingers 18 and has a rear portion 20 having a rear side face 22.

Figure 2:
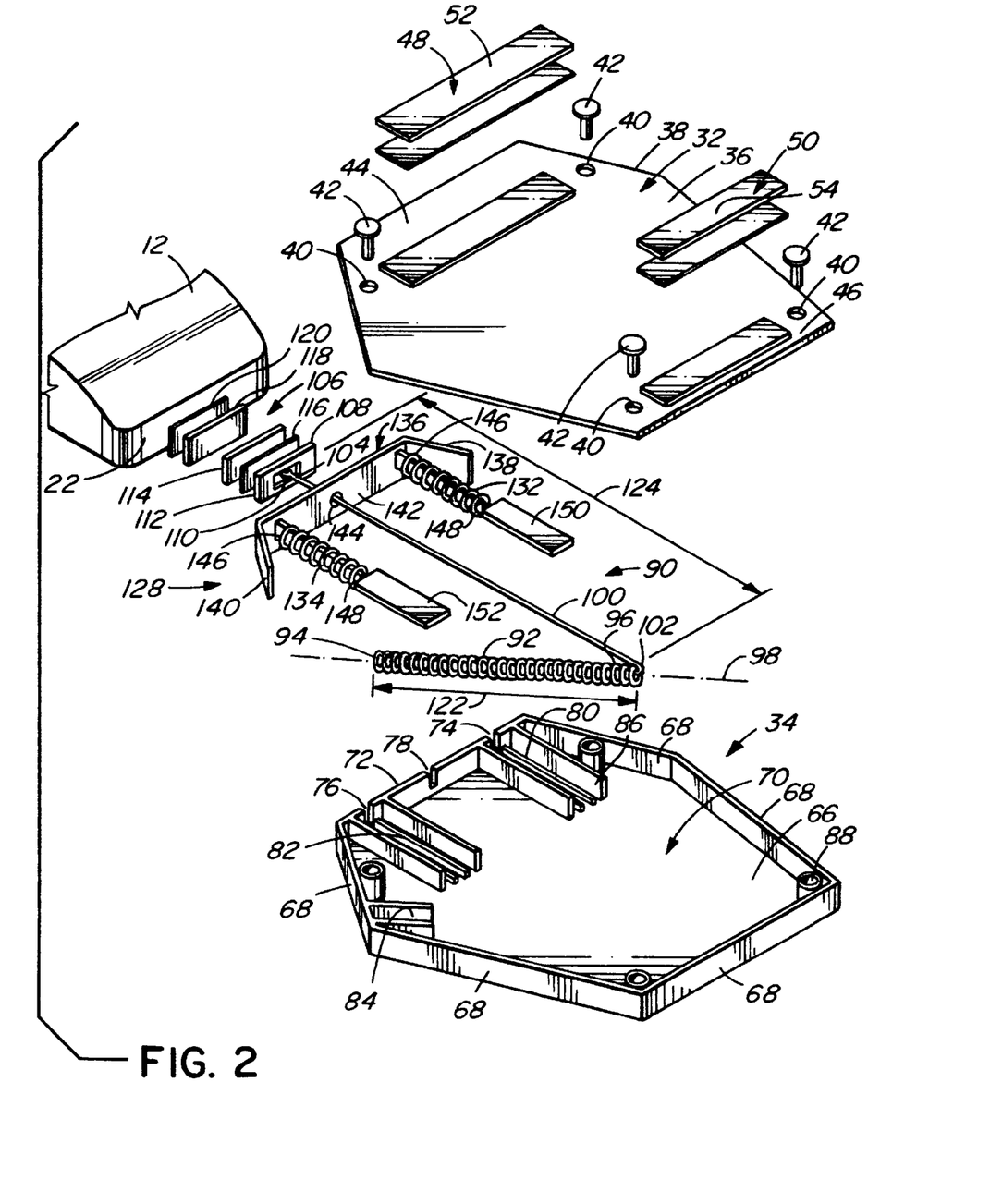
FIG. 2 is an exploded oblique view of an underside of the apparatus shown in FIG. 1.

The apparatus according to the first embodiment of the invention includes a hand support 24 having a housing 26 with forward and rearward side portions 28 and 30. Referring to FIG. 2, the housing 26 is comprised of a lower housing portion 32 and an upper housing portion 34. Both the lower housing portion 32 and the upper housing portion 34 are formed of lightweight plastic material such that the hand support has a total mass of about 30 grams. As computer mice typically have a mass in the range of about 80–120 grams, the hand support has a total mass which is considerably less than that of the mouse it is used with. In this embodiment, the hand support has a mass of about one-third of the mass of the mouse.

The lower housing portion 32 includes a flat plate member 36 having a perimeter edge 38 generally following the contour of the upper housing portion 34. The flat plate member 36 has a plurality of openings 40 for receiving respective fasteners 42 for fastening the plate member 36 to the upper housing portion 34.

The plate member 36 further has forward and aft end portions 44 and 46, to which are secured first and second TEFLON (trademark) pad members 48 and 50 respectively. The first and second TEFLON pad members are secured to the plate member by pressure sensitive adhesive and have low friction TEFLON surfaces 52 and 54 which rest on the work surface 11 (shown in FIG. 1) and enable the hand support 24 to easily slide on the work surface. The TEFLON pads thus act as low friction slidable portions on the housing.

Referring back to FIG. 1, the upper housing portion 34 has a heel support portion 56 having a flat surface 58 disposed adjacent the rearward side portion 30, operable to support the heel of the user's hand. The upper housing portion 34 also has a palm support 60 disposed adjacent the forward side portion 28, the palm support 60 including a projecting portion 62 and a palm contacting portion 64, for contacting and supporting the palm of the user's hand. When the user places a hand on the hand support 24, the heel portion of the hand rests on the flat surface 58 of the heel support portion 56 and the palm portion of the hand rests on the palm contacting portion 64 of the palm support 60.

Referring back to FIG. 2, the upper housing portion 34 is comprised of a flat planar member 66 and a plurality of edge members 68 depending therefrom, the edge members being disposed about the perimeter of the flat planar member 66 to define an open space 70 adjacent the flat planar member 66. A forward edge member 72 is disposed on a forward edge of the upper housing portion 34. The forward edge member 72 has a plurality of notches extending laterally therein, including first, second and third notches 74, 76 and 78 respectively.

The upper housing portion 34 further includes first, second and third receptacles 80, 82 and 84 comprised of respective upstanding members (one of which is shown at 86) extending from the edge members (68 or 72). A plurality of fastener bosses, one of which is shown at 88 are further provided to extend perpendicular to the flat planar member 66 for receiving fasteners operable to secure the lower housing portion 32 to the upper housing portion 34.

The apparatus further includes a coupler assembly shown generally at 90. The coupler assembly 90 includes an extension spring 92 having first and second end portions 94 and 96 and a longitudinal axis 98. The first end portion 94 is tightly received in the third receptacle 84 and is thereby connected to the upper housing portion 34 of the hand support. With the first end portion 94 of the extension spring 92 received in the third receptacle 84, the second end portion 96 thereof extends into the open space 70 and is operable to flex in a plane parallel to the flat planar member 66 such that the second end portion 96 may be bent away from the longitudinal axis 98 of the spring.

A length of string 100 acts as a flexible tension link and has first and second opposite end portions 102 and 104. The first end portion 102 is connected to the second end portion 96 of the extension spring 92. The string 100 is received in the third notch 78 in the forward edge member 72 such that the second end portion 104 of the string extends out of the upper housing portion 34. The third notch 78 thus acts as an opening in the housing through which the flexible tension link extends.

The apparatus further includes a first connector 106 operable to be connected to the mouse 12. The connector includes a flat tab member 108 having a pin 110 to which the second end portion 104 of the string 100 is secured. The flexible tension link thus extends between the first connector and the hand support.

The flat tab member 108 has a first distal flat surface 112 to which is secured a hook portion 114 of a conventional hook and loop fastener, by pressure sensitive adhesive 116. A loop portion 118 of the hook and loop fastener is similarly secured by pressure sensitive adhesive 120 to the rear side face 22 of the mouse 12. The hook and loop portions thus act as first and second complementary portions of the first connector 106 with at least one of the complementary portions being on the computer input device.

The extension spring 92 has a spring length 122 determined by the distance between the first and second end portions 94 and 96 thereof when the extension spring 92 is in the rest or relaxed state and the string 100 has a string length 124 similarly determined by the distance between its first and second end portions 102 and 104. Referring back to FIG. 1, the spring length 122 and the string length 124 are chosen such that when the extension spring 92 is in the rest or relaxed state, the longitudinal axis 98 of the spring is straight and linear and the second end portion 104 of the string 100 and hence the first connector 106 is disposed adjacent the forward side portion 28 of the housing, but spaced apart from the forward edge by a relatively small spacing distance 126, which in this embodiment is approximately 1.5 cm.

Referring back to FIG. 2, the apparatus further includes a spacer assembly shown generally at 128 for spacing the mouse from the hand support such that the mouse lies in a rest position in an operating space adjacent the hand support. The operating space is seen best at 130 in FIG. 1. Referring back to FIG. 2, the spacer assembly includes first and second compression springs 132 and 134 and a bumper 136 having first and second end portions 138 and 140 and an intermediate portion 142 disposed therebetween. The intermediate portion 142 has a first opening 144 disposed approximately centrally thereof, through which the string 100 extends and the first and second end portions 138 and 140 generally follow the contour of the upper housing portion 34. In this embodiment, the bumper 136 is formed from a rectangular cross-sectioned rod of hard plastic.

The first and second compression springs 132 and 134 each have respective first and second end portions 146 and 148, the second end portions 148 of the compression springs being connected to respective retainer members 150 and 152 and the first end portions 146 being connected to the intermediate portion 142 of the bumper 136 adjacent respective opposite end portions. The retainer members 150 and 152 are received in the first and second receptacles 80 and 82 such that the first and second compression springs 132 and 134 are disposed outside the upper housing portion 34 on opposite sides of the third notch 78, with the respective second end portions 148 abutting the forward edge member 72 as seen best in FIG. 1. The first and second compression springs 132 and 134 thus extend in a direction normal to the forward edge member 72 and the bumper 253 extends on opposite sides of the third notch (78 not shown in FIG. 1).

The first and second compression springs 132 and 134, in their rest, or relaxed state, have an extension of approximately 1.5 cm and thereby position the bumper 136 to lie between the hand support 24 and the connector 106 at a distance 126 of approximately 1.5 cm from the forward edge member 72 of the hand support 24. Thus, the connector 106 is in close contact with the bumper, when the extension spring 92 is in the rest position.

Operation

Referring to FIG. 1, the apparatus is shown with the mouse in a rest position, as shown in solid outline. In this position, the extension spring 92 is in its rest position and the string 100 is fully retracted into the housing 26 such that only approximately 1.5 cm thereof projects outside of the housing. Also, in this position, the first connector 106 is withdrawn by the string 100 to abut the bumper 136, and the mouse 12 attached to the first connector 106 is positioned within the operating space 130 adjacent the forward edge member 72 of the housing, adjacent the third notch (78 not shown) and beneath the palm contacting portion 64.

In the event that the user desires to draw the mouse 12 toward the hand support 24, in the direction of arrow 154, the user simply grasps the mouse 12 with the fingers 18 and pulls the mouse 12 in direction of arrow 154 whereby the rear side face 22 of the mouse 12 abutting the first connector 106, pushes the bumper 136 toward the forward edge member 72 of the housing 26 thereby compressing the first and second compression springs 132 and 134. The mouse 12 is thus able to move in the direction of arrow 154 by approximately 1cm as limited by the first and second compression springs 132 and 134 in their compressed state.

In the event that the user removes the grip on the mouse 12, the mouse 12 will remain fully withdrawn toward the hand support 24 as the combined force provided by the compression springs 132 and 134 is not great enough to overcome the force of friction between the mouse 12 and the work surface 11. In this embodiment, this force is within the range of 0.09N–0.15N.

When the entire hand is raised off of the hand support 24 compression springs 132 and 134 urge the hand support 24 back away from the mouse 12, into the rest position. Due to the difference in mass between the mouse and the hand support, the mouse 12 stays relatively stationary while the hand support 24 moves away from the mouse 12. The extension spring 92 absorbs any overshoot forces between the rear side face 22 of the mouse 12 and the bumper 136 and repositions the hand support 24 approximately 1.5 cm from the mouse 12 in a position ready to receive the user's hand.

When the mouse 12 is in the rest position and the user desires to move it in a direction opposite to arrow 154, the user grasps the mouse 12 and extends the fingers 18 which moves the mouse 12 away from the housing 26, pulling the first connector 106 with it. The first connector 106 is thus extendable relative to the hand support.

As the second end portion 104 of the string 100 is connected to the first connector 106, the string 100 is withdrawn from the housing 26 through the opening provided by the third notch 78 (shown in FIG. 2), whereby the first end portion 102 of the string 100 pulls the second end portion 96 of the extension spring off of the longitudinal axis 98, into an arcuate form as shown in broken outline. The spring constant of the extension spring 92 provides a force in the direction of arrow 154 tending to urge the first connector 106 and mouse 12 connected thereto back toward the hand support 24, thus, the mouse 12 and hand support 24 are urged together. By flexing the extension spring 92 off axis, in the manner shown in broken outline in FIG. 1, a force is provided in the direction of arrow 154, over a range of travel of the first connector and mouse connected thereto. The force is in the range of approximately 0.07–0.17N and in this embodiment is 0.09–0.15N.

The range of travel of the first connector may be defined as the distance between any point on the first connector 106 in the rest position to the same point on the first connector 106 when the first connector 106 and mouse 12 connected thereto is fully extended from the hand support 24 and is limited by the string length which in this embodiment is approximately 4 cm. In this embodiment, the range of travel therefore is approximately 0–4 cm.

In the event that the user removes the grip on the mouse 12, the mouse 12 will remain fully extended from the hand support 24 as the force provided by the extension spring 92 is not great enough to overcome the force of friction between the mouse 12 and the work surface 11.

When the entire hand is raised off of the hand support 24 the extension spring 92 urges the hand support 24 back toward the mouse 12, into the rest position. Due to the difference in mass between the mouse and the hand support, the mouse 12 stays relatively stationary while the hand support 24 moves toward the mouse 12. The first and second compression springs 132 and 134 absorb any collision forces between the rear side face 22 of the mouse 12 and the bumper 136 and reposition the hand support 24 approximately 1.5 cm from the mouse 12 in a position ready to receive the user's hand.

In effect, the first connector 106 is coupled to the hand support 24 to permit extension and retraction of the first connector 106 relative to the hand support 24, in the operating space 130 adjacent to the hand support 24. The extension spring 92 and string 100 act as an urger for urging together the first connector and the hand support. The bumper 136 and first and second compression springs 132 and 134 act as a spacer for spacing apart the first connector and the hand support.

With the urging together of the mouse 12 and hand support 24 as provided by the extension spring 92, and the spacing apart of the mouse 12 and hand support 24 as provided by the first and second compression springs 132 and 134, the hand support 24 will follow the mouse 12 as the mouse is moved by the user and will remain spaced apart from the mouse. The mouse and hand support 24 are thus coupled or fastened together for this combined effect. Thus, the hand support 24 will be positioned ready for use, behind the mouse 12 at all times. This allows the user to concentrate on mouse 12 movements rather than having to concentrate on moving both the mouse 12 and the hand support 24. The user thus operates the mouse 12 in the conventional manner and the hand support 24 is conveniently positioned behind the mouse 12. Thus, after moving the mouse 12, when the user removes his hand, the hand support 24 is always positioned ready to receive the hand to support its weight in a position which reduces fatigue on the hand.

Figure 3:
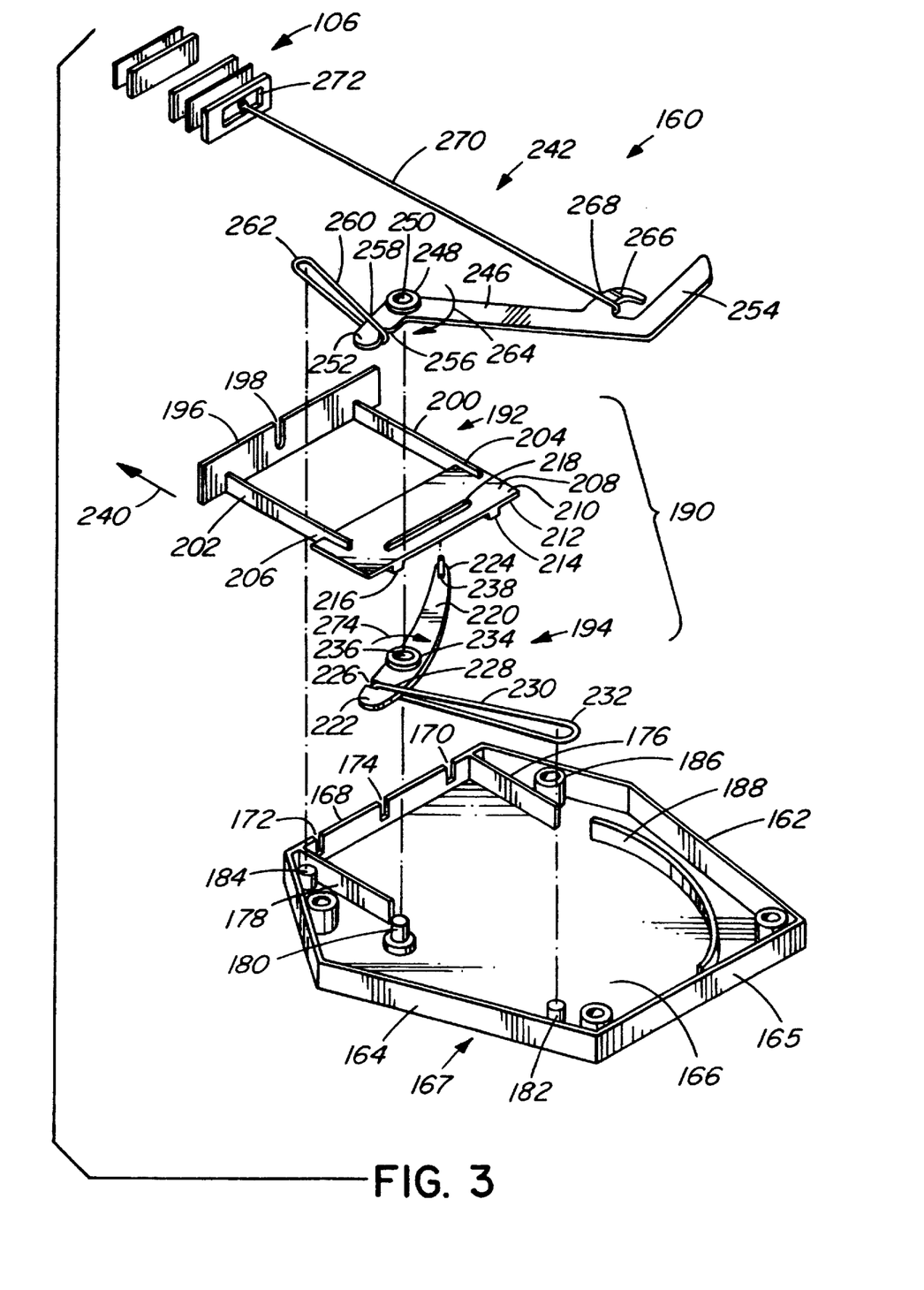
FIG. 3 is an exploded oblique view of an underside of an apparatus according to a second embodiment of the invention.
Figure 4:
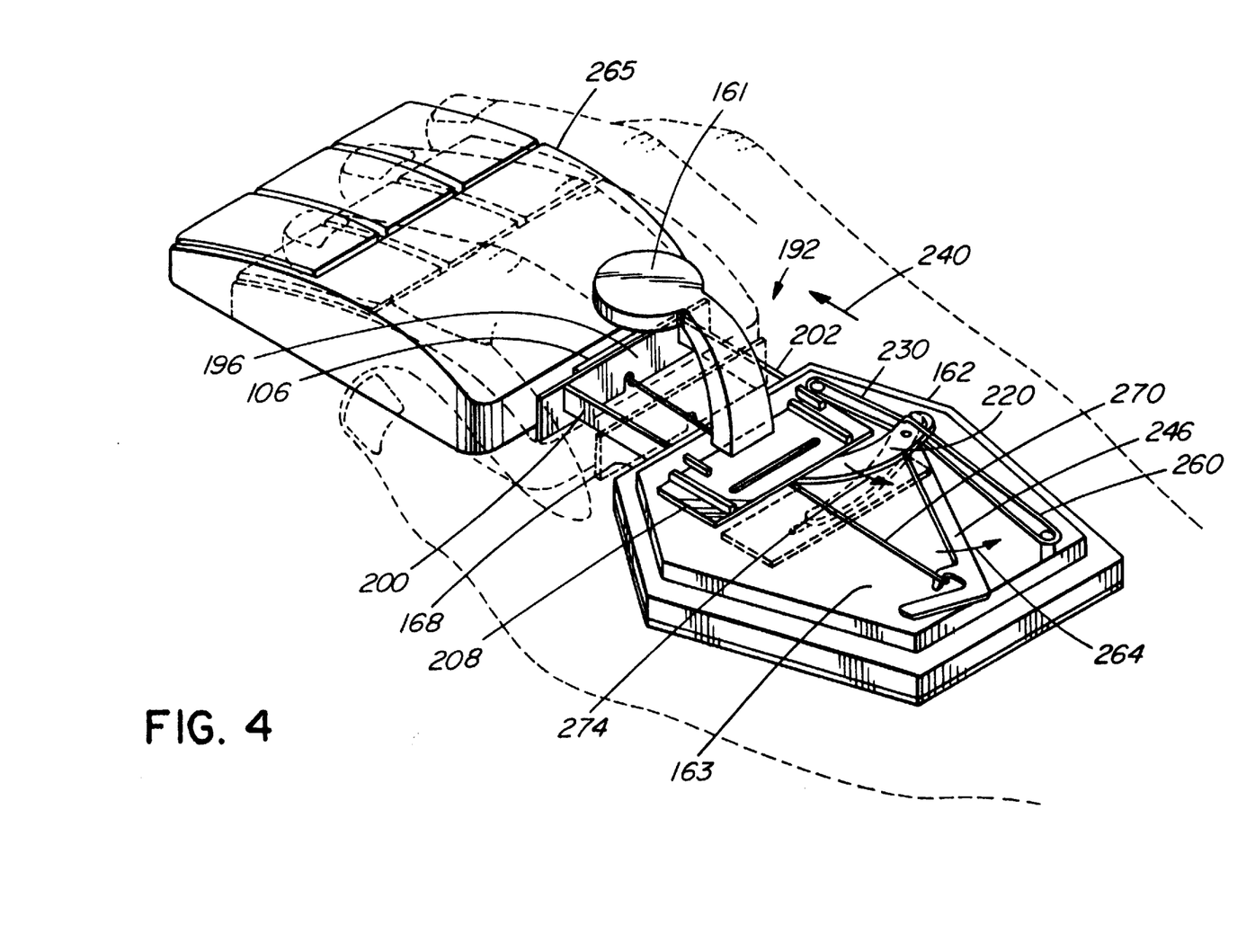
FIG. 4 is a partially fragmented oblique view of the apparatus shown in FIG. 3.

Referring to FIG. 3, an apparatus according to a second embodiment of the invention is shown generally at 160. The apparatus includes a light-weight, plastic hand support having an upper housing portion 162 having a plurality of edge members 164, and a planar member 166. Referring to FIG. 4, the hand support also has a palm support portion 161 and a heel support 163.

Referring back to FIG. 3, as with the previous embodiment, the edge members extend at right angles to the planar member 166. The edge members include a forward edge member 168 having first, second and third notches 170, 172 and 174 formed transversely therein. Also, extending at right angles from the forward edge member 168 are first and second wall portions 176 and 178 respectively. The first, second and third notches 170, 172 and 174 are thus disposed on the forward edge member 168 between the first and second wall portions 176 and 178. The first and second wall portions 176 and 178 extend within the bounds of the edge members 164, approximately one-third of the length of the upper housing portion 162.

The planar member 166 further has first, second and third pins 180, 182 and 184 extending at right angles thereto. The planar member also has four mounting bosses, one of which is shown at 186, extending at right angles thereto for mounting a lower housing portion such as shown at 32 in FIG. 2 to the upper portion of the housing. The planar member 166 further has a curved guide wall 188 extending at right angles thereto between the first wall portion 76 and a rear edge member 165.

A spacer assembly according to the invention is shown generally at 190 and includes a bumper assembly shown generally at 192 and a force applying assembly shown generally at 194. The bumper assembly includes a bumper 196, which, in this embodiment is a flat planar, rectangular sheet-like portion of plastic. The bumper has a transversely extending notch 198 disposed therein, approximately midway therealong. First and second arm members 200 and 202 are connected in spaced apart fashion to the bumper 196 such that distal end portions 204 and 206 thereof extend at right angles to the bumper 196. The first and second arm portions are received in the first and second notches 170 and 172 respectively.

To the distal end portions 204 and 206 is connected a sheet member 208 disposed in a plane generally at right angles to the plane of the bumper 196, and having first and second sides 210 and 212, with first and second skid members 214 and 216 secured to extend transversely across the second side 212 of sheet member 208. The sheet member 208 further has a longitudinally extending slot 218 formed therein, extending between the first and second skid members 214 and 216.

The force applying assembly 194 includes a first spacer lever 220 having first and second opposite end portions 222 and 224. The first end portion 222 has a first notch 226 extending transversely therein for receiving a first end portion 228 of an elastic band 230. A second end portion 232 of the elastic band 230 is wrapped around the second pin 182.

The first spacer lever also has a first collar 234 having an opening 236 for receiving the first pin 180 therethrough. The first spacer lever 220 is thus operable to pivot about the first pin 180, and is biased by the elastic band 230 extending about the second pin 182. The second end portion 224 has an upstanding camming pin 238 which is operable to be received in the longitudinally extending slot 218 in the sheet member 208. Thus, in the rest position, the spacer lever 220 biases the bumper assembly 192 in the direction of arrow 240.

The apparatus further includes a coupler shown generally at 242, including a second lever 246 having a second collar 248 with an opening 250 also for receiving, a portion, of first pin 180 therein. A lower portion of the second collar 248 (not shown) is operable to rest on and move relative to an upper portion of the first collar 234 of the spacer lever 220. Thus the first and second levers 220 and 246 are stacked on the first pin 180.

The second lever 246 has first and second opposite end portions 252 and 254 and has a somewhat Z-shape. The first end portion has a first notch 256 extending transversely therein to which is connected a first end portion 258 of an elastic band 260. A second end portion 262 of the elastic band is received around the third pin 184, such that the second lever 246 is biased in the direction of arrow 264.

The second end portion 254 of the second lever 246 has a hook portion 266 to which is secured a first end portion 268 of a first flexible tension link 270. The first flexible tension link further has a second end portion 272 which is connected to a first connector 106, the same as that described in connection with the first embodiment. The flexible tension link 270 extends through the notch 174 and the notch 198.

Operation

In operation, the bumper assembly 192 is biased in the direction of arrow 240 such that bumper 196 is spaced apart from the forward edge member 168 by approximately 1.5 cm. The bumper is thus positioned to lie between the hand support and the connector. Similarly, the second lever 246 is biased in the direction of arrow 264 such that the first connector 106 and any mouse 265 connected thereto is urged toward the upper housing portion 162. The user (not shown) may move the mouse such that the flexible tension link 270 is retracted from the housing or such that the bumper 196 is pushed against the forward edge member 168.

When the user extends the mouse relative to the housing, the flexible tension link 270 is tensioned whereby the second lever 246 is rotated in a direction opposite to arrow 264 thereby stretching the elastic band 260 and creating an increased biasing force in the direction of arrow 264, tending to pull the first connector 106 back towards the housing, with greater strength. The greater the extension of the first connector 106 and the mouse relative to the housing, the greater the force provided by elastic band 260. However, the force provided is on the order of 0.15N, which is relatively light so as not to seriously impede free movement of the mouse relative to the housing.

When the user has finished using the mouse, the elastic band 260 attempts to draw the connector 106 back towards the housing 162, however, because the housing 162 has less mass than the mouse, the housing 162 is drawn toward the mouse and connector 106, by the elastic band 260 acting on the second lever 246. Thus, in effect, when the mouse is moved away from the housing, the second lever 246 acts to draw the housing back toward the mouse.

When the mouse 265 is pulled back toward the housing such that the bumper 196 contacts the mouse, the bumper 196 may be pushed inwardly, in a direction opposite to arrow 240, such that first and second arm members 200 and 202 are pushed into the upper housing portion 162 whereby the spacer lever 220 is rotated in the direction of arrow 274. This, of course, extends elastic band 230 tending to impose a force on the spacer lever 220 in a direction opposite to arrow 274 tending to push the sheet member 208 with greater force in the direction of arrow 240, into the position shown in broken outline. Thus, when the mouse is moved toward the housing, bumper 196 and the spacer lever 220 act to push the housing away from the mouse. Thus, the first and second levers 220 and 246 act to position the mouse at a predetermined distance from the housing, such that the housing is always positioned in a convenient location behind the mouse, which in this embodiment, is approximately 1.5 cm behind the mouse.

The apparatus allows the user to concentrate on moving the mouse without regard to the position of the housing, as the housing will always be positioned in the appropriate location behind the mouse. The apparatus according to the second embodiment is considered to be favourable over the apparatus according the first embodiment for mass production considerations. In particular, the use of elastic bands over springs provides a low cost implementation and the use of the first and second arm members 200 and 202 on the bumper assembly 192 allows the bumper 196 to be positioned closer to the forward edge member 168.

While specific embodiments of the invention have been described and illustrated, such embodiments should be considered illustrative of the invention only and not as limiting the invention as construed in accordance with the accompanying claims.

What is claimed is:

1. An apparatus for supporting a hand during use of a computer input device on a work surface, the apparatus comprising;
    a) a first connector connectable to the computer input device;
    b) a hand support operable to slide on the work surface, said hand support including a housing having an opening; and
    c) an urger connected between said first connector and said hand support and extending through said opening in said housing for urging the hand support relative to the first connector, to position said hand support in a rest position adjacent said computer input device, said urger being operable to be withdrawn and retracted through said opening to permit extension and retraction of said first connector relative to said hand support in an operating space adjacent said hand support.

2. An apparatus as claimed in claim 1 wherein said urger includes a flexible tension link extending between said first connector and said hand support.

3. An apparatus as claimed in claim 1 wherein said urger is operable to provide a force between said first connector and said hand support over a range of travel of said first connector relative to said hand support.

4. An apparatus as claimed in claim 3 wherein said force is within a range of between 0.07N–0.17N.

5. An apparatus as claimed in claim 1 wherein said urger includes a flexible tension link and a spring connected between said flexible tension link and at least one of said first connector and said hand support.

6. An apparatus as claimed in claim 5 wherein said spring includes an extension spring having first and second end portions and a longitudinal axis, said first end portion being connected to said hand support and said second end portion being connected to said flexible tension link such that said spring is bent off said longitudinal axis when said flexible tension link is withdrawn from said hand support.

7. An apparatus as claimed in claim 6 wherein said hand support has a palm support for supporting the palm of a user's hand.

8. An apparatus as claimed in claim 7 wherein said palm support is positioned adjacent said opening and adjacent the operating space.

9. An apparatus as claimed in claim 8 further including a spacer positioned on the hand support for spacing the computer input device relative to the hand support such that the computer input device lies in a rest position spaced apart from said hand support in said operating space.

10. An apparatus as claimed in claim 9 wherein said spacer includes a bumper positioned to lie between the hand support and the connector and at least one compression spring for connecting said bumper to said hand support and for positioning said bumper at a distance from said hand support.

11. An apparatus as claimed in claim 10 wherein said bumper extends on opposite sides of said opening.

12. An apparatus as claimed in claim 1 wherein said housing has a low friction slidable portion operable to slide on the work surface.

13. An apparatus as claimed in claim 1 wherein said housing has a heel support for supporting the heel of a user's hand.

14. An apparatus as claimed in claim 1 wherein said first connector includes first and second complementary portions, at least one of said complementary portions being on the computer input device.

15. An apparatus as claimed in claim 1 further including a spacer positioned on the hand support for spacing the computer input device relative to the hand support such that the computer input device lies in a rest position spaced apart from said hand support in said operating space.

16. An apparatus as claimed in claim 15 wherein said spacer includes a bumper positioned to lie between the hand support and the first connector and at least one compression spring for connecting said bumper to said hand support and for positioning said bumper at a distance from said hand support.

17. An apparatus as claimed in claim 15 wherein said spacer includes a bumper positioned to lie between the hand support and the connector, a lever connected to said bumper and pivotal relative to said hand support and an elastic band connected between said lever and said hand support such that said lever is biased into a rest position to position said bumper at a distance from said hand support and such that said lever rotates to extend said elastic band when said bumper is moved toward said hand support, thereby providing a force on said lever, tending to rotate said lever to move said bumper back into said rest position.

18. An apparatus as claimed in claim 17 wherein said bumper is operable to contact said hand support.

19. An apparatus as claimed in claim 1 wherein said hand support includes a palm support adjacent the operating space, for supporting the palm of a user's hand, and a heel support adjacent said palm support for supporting the heel of the user's hand.

20. An apparatus as claimed in claim 1 wherein the hand support has a mass of approximately 30 grams.

21. An apparatus as claimed in claim 1 wherein said first connector has a range of travel of approximately 0–4 cm.

22. An apparatus as claimed in claim 1 wherein said urger includes a flexible tension link and a lever, the lever being pivotal relative to the hand support, the flexible tension link being connected to the lever and said first connector and the lever being biased to pull said flexible tension link toward said hand support.

23. An apparatus as claimed in claim 22 wherein said urger includes an elastic band connected to said lever and said hand support to bias said lever into a position in which said flexible tension link is pulled toward said hand support.

24. An apparatus as claimed in claim 1 wherein said opening is positioned adjacent the operating space.

25. An apparatus as claimed in claim 24 wherein said hand support has a palm support for supporting the palm of a user's hand.

26. An apparatus as claimed in claim 25 wherein said palm support is positioned adjacent said opening and adjacent the operating space.

* * * * *